United States Patent
Kim

(10) Patent No.: US 7,236,479 B2
(45) Date of Patent: Jun. 26, 2007

(54) APPARATUS AND METHOD FOR CONTROLLING TRANSMISSION ANTENNA ARRAYS FOR A HIGH SPEED PHYSICAL DOWNLINK SHARED CHANNEL IN A MOBILE COMMUNICATION SYSTEM

(75) Inventor: Sung-Jin Kim, Suwon (KR)

(73) Assignee: Samsung Electronics Co., Ltd. (KR)

( * ) Notice: Subject to any disclaimer, the term of this patent is extended or adjusted under 35 U.S.C. 154(b) by 789 days.

(21) Appl. No.: 10/680,809

(22) Filed: Oct. 7, 2003

(65) Prior Publication Data

US 2004/0067776 A1 Apr. 8, 2004

(30) Foreign Application Priority Data

Oct. 8, 2002 (KR) .................... 10-2002-0061314

(51) Int. Cl.
*H04Q 7/00* (2006.01)
(52) U.S. Cl. ..................... 370/334; 455/442
(58) Field of Classification Search ............ 370/329, 370/331, 332, 333, 334; 455/436, 437, 442, 455/69, 561, 562.1
See application file for complete search history.

(56) References Cited

U.S. PATENT DOCUMENTS

| 6,952,455 B1* | 10/2005 | Banister ............. 375/267 |
| 2002/0131381 A1* | 9/2002 | Kim et al. ........... 370/335 |
| 2003/0148738 A1* | 8/2003 | Das et al. ............ 455/67.5 |
| 2005/0037718 A1* | 2/2005 | Kim et al. ............. 455/101 |

FOREIGN PATENT DOCUMENTS

| EP | 1 204 219 | 5/2002 |
| JP | 2002-247629 | 8/2002 |
| WO | WO 02/41524 | 5/2002 |

OTHER PUBLICATIONS

European Search Report dated Feb. 2, 2004 issued in a counterpart application, namely, Appln. No. 03256324.9.
Universal Mobile Telecommunications System (UMTS); Physical Layer Procedures (FDD), 1999.

* cited by examiner

*Primary Examiner*—Nguyen T. Vo
(74) *Attorney, Agent, or Firm*—The Farrell Law Firm

(57) ABSTRACT

An apparatus and method for controlling transmission antenna arrays for a high-speed physical downlink shared channel (HS-PDSCH), which coexists with a dedicated physical channel (DPCH), from a first base station to a mobile station, for taking into consideration a soft handover between the mobile station and the first through K-th base stations are provided. The method comprises obtaining a first partial weight by equally considering channel characteristics of the first through K-th base stations, obtaining a second partial weight by emphasizing a channel characteristic of the first base station more than channel characteristics of the second through K-th base stations, and transmitting one of the first and second partial weights to the first through the K-th base stations as feedback information according to whether high-speed packet data is transmitted to the mobile station.

21 Claims, 3 Drawing Sheets

APPARATUS AND METHOD FOR CONTROLLING TRANSMISSION ANTENNA ARRAYS FOR A HIGH SPEED PHYSICAL DOWNLINK SHARED CHANNEL IN A MOBILE COMMUNICATION SYSTEM

CROSS-REFERENCE TO RELATED APPLICATIONS

This application claims the priority of Korean Patent Application No. 2002-61314, filed on Oct. 8, 2002, in the Korean Intellectual Property Office, the disclosure of which is incorporated herein by reference.

BACKGROUND OF THE INVENTION

1. Field of the Invention

The present invention relates generally to a mobile communication system, and more particularly, to an apparatus and method for controlling transmission antenna arrays for a high-speed physical downlink shared channel (HS-PDSCH), which coexists with a dedicated physical channel (DPCH), for taking into consideration a soft handover of a mobile communication system.

2. Description of the Related Art

An HS-PDSCH used in a wideband code division multiple access (WCDMA) system using an asynchronous mobile communication method among third generation mobile communication methods is a channel shared by a plurality of users or user equipments (UEs). In other words, the HS-PDSCH is assigned to a plurality of UEs to transmit packet data in units of 2-ms radio sub-frames to each UE. In the HS-PDSCH, packet data can be transmitted at different rates, and a weight on a transmission antenna array can be adjusted in units of slots as in a dedicated channel (DCH) set between a base station and a UE in the WCDMA system. The radio sub-frame is a unit in which high-speed packet data is transmitted in the WCDMA system and has a length of 2 ms. Five radio sub-frames exist in a single radio frame. The radio frame is a basic unit in which a signal is transmitted in the WCDMA system and has a length of 10 ms. Fifteen slots constitute a single radio frame.

The HS-PDSCH transmits only user data. For weight control of the HS-PDSCH, when the HS-PDSCH is allocated to a UE, simultaneously, a downlink dedicated physical channel (DL-DPCH) is allocated to the UE. The DL-DPCH is used for the weight control of the HS-PDSCH. The HS-PDSCH transmissions can be performed during multiple sub-frames or a single sub-frame to a single UE or user. The time at which a frame is to be transmitted to a plurality of UEs is determined via scheduling of a higher layer. The scheduling result is transmitted to each UE using a high-speed shared control physical channel (HS-SCCH) corresponding to the HS-PDSCH.

Operations of the HS-PDSCH, the HS-SCCH, and the DL-DPCH are described in detail in TSG-RAN WG1 Specification #25.314 (3GPP TS 25.214) made by Third Generation Partnership Project (3GPP) standardization committee. Specifications are provided on an official file service site, i.e., www. 3gpp.org.

SUMMARY OF THE INVENTION

The present invention provides an apparatus and method for controlling transmission antenna arrays for a high speed physical downlink shared channel (HS-PDSCH) in a mobile communication system, through which, for the purpose of preparing a soft handover between a mobile station and a first through a K-th base station, a weight obtained by equally considering channel characteristics of all base stations within a soft handover region or a weight obtained by emphasizing a channel characteristic of a base station transmitting a HS-PDSCH more than channel characteristics of the other base stations taking into account a transmission state of the HS-PDSCH is transmitted to a base station according to whether the base station transmits high speed packet data to the mobile station.

According to an aspect of the present invention, there is provided an apparatus for controlling transmission antenna arrays for a high speed physical downlink shared channel, which coexists with a dedicated physical channel, from a first base station to a mobile station, for taking into consideration a soft handover between the mobile station and the first through K-th base stations in a mobile communication system, the mobile station comprising: a first partial weight generating unit for obtaining a first partial weight by equally considering channel characteristics of the first through K-th base stations; a second partial weight generating unit for obtaining a second partial weight by emphasizing a channel characteristic of the first base station more than channel characteristics of the second through K-th base stations; and a switching unit for transmitting one of the first and second partial weights to the first through the K-th base stations as feedback information according to whether high-speed packet data is transmitted to the mobile station.

According to another aspect of the present invention, there is provided a method of controlling transmission antenna arrays for a high speed physical downlink shared channel, which coexists with a dedicated physical channel, from a first base station to a mobile station, for taking into consideration a soft handover between the mobile station and the first through K-th base stations in a mobile communication system, the method comprising the steps of: obtaining a first partial weight by equally considering channel characteristics of the first through K-th base stations; obtaining a second partial weight by emphasizing a channel characteristic of the first base station more than channel characteristics of the second through K-th base stations; and transmitting one of the first and second partial weights to the first through the K-th base stations as feedback information according to whether high-speed packet data is transmitted to the mobile station.

Additionally, the method may be implemented by a computer readable medium having embodied thereon a computer program for executing the method.

BRIEF DESCRIPTION OF THE DRAWINGS

The above and other features and advantages of the present invention will become more apparent by describing in detail preferred embodiments thereof with reference to the attached drawings, in which.

DETAILED DESCRIPTION OF THE INVENTION

Preferred embodiments of the present invention will be described in detail herein below with reference to the attached drawings. In the following description, well-known functions or constructions are not described in detail since they would obscure the invention in unnecessary detail.

Figure 1:
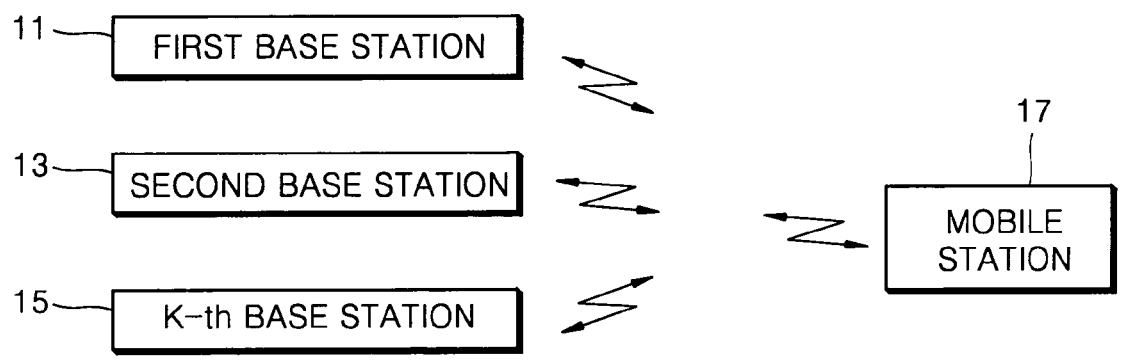
FIG. 1 is a schematic block diagram of a mobile communication system according to the present invention.

FIG. 1 is a schematic block diagram of a mobile communication system according to the present invention. As illustrated in FIG. 1, the mobile communication system includes a mobile station 17, and first through K-th base stations 11 through 15 (where K is an integer equal to or greater than 2), which exist in a soft handover region, that is, may be in a soft handover process with the mobile station 17. The first through K-th base stations 11 through 15 perform the same functions. According to the present invention, each of the first through K-th base stations 11 through 15 includes two or more antennas.

Figure 2:
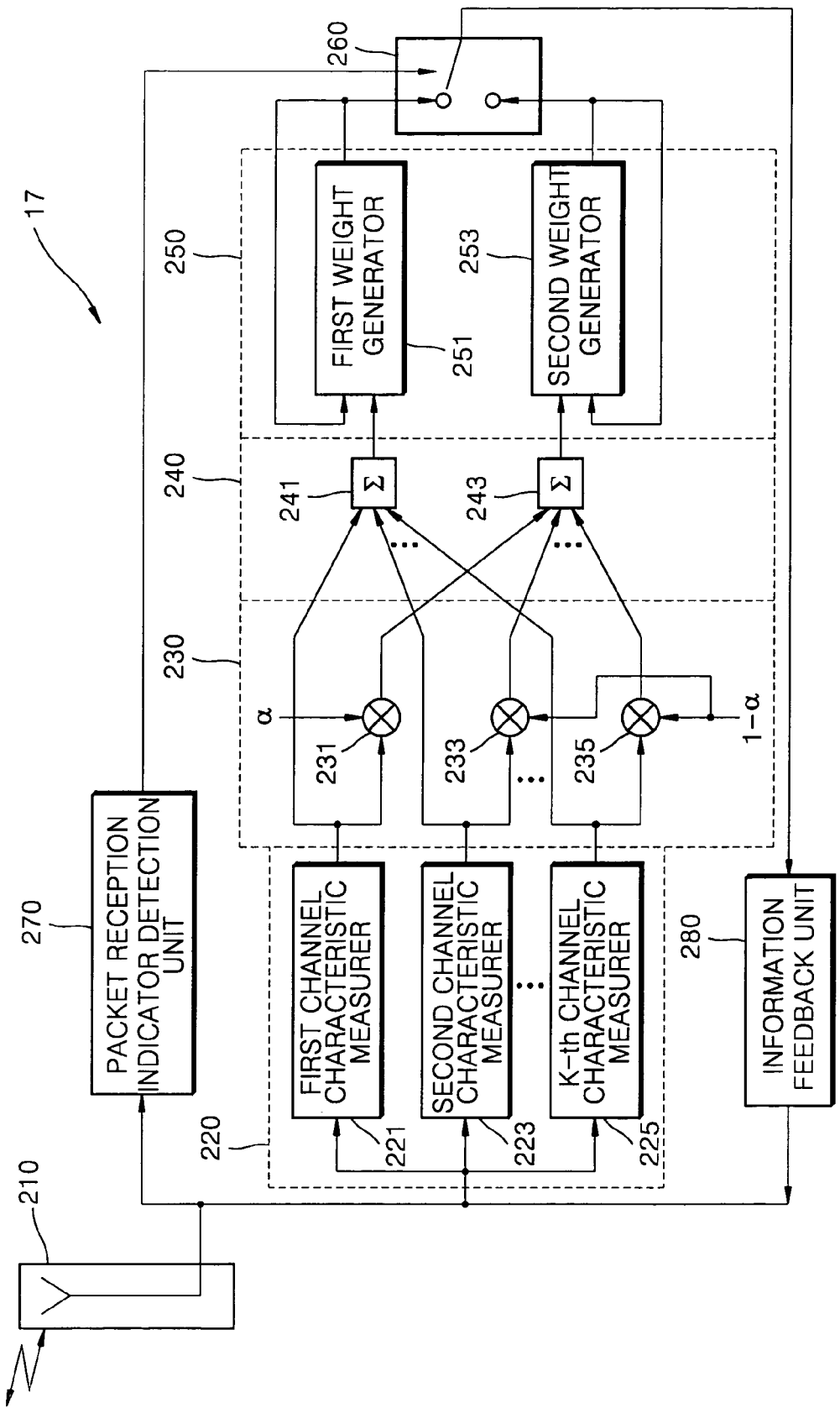
FIG. 2 is a block diagram of a mobile station according to an embodiment of the present invention.

FIG. 2 is a block diagram of the mobile station 17 as illustrated in FIG. 1, according to an embodiment of the present invention. As illustrated in FIG. 2, the mobile station 17 includes an antenna 210, a channel characteristic measurement unit 220, a multiplication unit 230, an addition unit 240, a weight generation unit 250, a switching unit 260, an information feedback unit 270, and a packet reception indicator detection unit 270. The channel characteristic measurement unit 220 includes first through K-th channel characteristic measurers 221 through 225. The multiplication unit 230 includes first through K-th multipliers 231 through 235. The addition unit 240 includes first and second adders 241 and 243. The weight generation unit 250 includes first and second weight generators 251 and 253.

In the operation of the mobile station 17, the antenna 210 receives pilot signals, downlink dedicated physical channel (DL-DPCH) information, high-speed physical downlink shared channel (HS-PDSCH) information, and high speed shared control physical channel (HS-SCCH) information from the first through K-th base stations 11 through 15, illustrated in FIG. 1. Here, it is assumed that the HS-PDSCH transmission is performed from the first base station 11.

The first through K-th channel characteristic measurers 221 through 225 of the channel characteristic measurement unit 220 measure channel characteristics H(k) from the pilot signals received from the respective first through K-th base stations 11 through 15 through the antenna 210 and output the channel characteristics H(k) to the first through K-th multipliers 231 through 235, respectively, of the multiplication unit 230 and to the first adder 241 of the addition unit 240. In a channel characteristic H(k), a value of "k" is a number allocated to a base station of which the channel characteristic is measured by a corresponding channel characteristic measurer 221, 223, or 225.

The first multiplier 231 of the multiplication unit 230 multiplies a channel characteristic H(1) measured by the first channel characteristic measurer 221 by a first multiplication coefficient of α and outputs the result of multiplication, αH(1), to the second adder 243. The second through K-th multipliers 233 through 235 multiply channel characteristics H(2) through H(k) measured by the second through K-th channel characteristic measurers 223 through 225, respectively, by a second multiplication coefficient of (1-α) and respectively output the multiplication results, (1-α)H(2) through (1-α)H(k) to the second adder 243. The first multiplication coefficient α by which the channel characteristic of the first base station 11 transmitting the HS-PDSCH is multiplied is greater than the second multiplication coefficient (1-α) by which the channel characteristics of the respective second through K-th base stations 13 through 15 are multiplied. The first multiplication coefficient α is less than or equal to 1. For example, α=0.7 enhances PDSCH performance while ensuring is only a small degradation on the DPCH.

The first adder 241 of the addition unit 240 performs addition after an inner product on the channel characteristics H(1) through H(k) received from the first through K-th channel characteristic measurers 221 through 225, respectively, as shown in Equation (1), and outputs the result of the addition after the inner product, i.e., a first intermediate value $R_1$, to the first weight generator 251 of the weight generation unit 250. The first intermediate value $R_1$ is obtained by equally considering channel characteristics of all base stations within a soft handover region.

$$R_1 = \sum_{k=1}^{K} H^H(k)H(k) \qquad (1)$$

The second adder 243 performs addition after an inner product on the channel characteristics αH(1) and (1-α)H(2) through (1-α)H(k) received from the first through K-th multipliers 231 through 235, respectively, as shown in Equation (2), and outputs the result of performing the addition after the inner product, i.e., a second intermediate value $R_2$, to the second weight generator 253 of the weight generation unit 250. The second intermediate value $R_2$ is obtained by emphasizing a channel characteristic of a base station transmitting a HS-PDSCH more than channel characteristics of the other base stations.

$$R_2 = \alpha H^H(1)H(1) + (1-\alpha)\sum_{k=2}^{K} H^H(k)H(k) \qquad (2)$$

The first weight generator 251 of the weight generation unit 250 calculates a current first partial weight vector $\Delta W_1$ using a previous first partial weight vector and the first intermediate value $R_1$ received from the first adder 241 and outputs the current first partial weight vector $\Delta W_1$ to the switching unit 260. The second weight generator 253 of the weight generation unit 250 calculates a current second partial weight vector $\Delta W_2$ using a previous second partial weight vector and the second intermediate value $R_2$ received from the second adder 243 and outputs the current second partial weight vector $\Delta W_2$ to the switching unit 260.

A method of each of the first and second weight generator 251 and 253 generating a weight vector is described in detail in 3GPP specification 25.214 and uses a differential method using previous weight information, as illustrated in FIG. 2. Accordingly, in 100% of entire weight information, previous weight information is maintained for 75% of the entire weight information, and a partial weight vector ΔW is newly calculated for 25% of the entire weight information. A proportion of 75% to 25% is set for mode 2 in the specifications. For mode 1, a proportion of 50% to 50% is set.

The weight information output to the switching unit 260 is not the entire weight but a partial weight. Accordingly, it should be noted that when an error occurs in previous weight information or when wrong information is recognized as previous weight information, an error occurs in weight generation because a new weight is obtained using 75% or 50% of previous weight information.

The switching unit 260 selects one of the first partial weight vector $\Delta W_1$ received from the first weight generator 251 and the second partial weight vector $\Delta W_2$ received from the second weight generator 253 according to a switch control signal of the packet reception indicator detection unit 270 and outputs the selected partial weight vector $\Delta W$ to the information feedback unit 280.

The packet reception indicator detection unit 270 detects a signal indicating reception of high-speed packet data to the mobile station 17, i.e. packet reception indicator from the signal received through the antenna 210. When the packet reception indicator detection unit 270 receives the packet reception indicator, it generates the switch control signal for selecting the second partial weight vector $\Delta W_2$ starting from a time when the reception of the high-speed packet data is recognized to a time when transmission of the high-speed packet data is completed. Otherwise, the packet reception indicator detector 270 generates the switch control signal for selecting the first partial weight vector $\Delta W_1$.

As described above, the first and second partial weight vectors $\Delta W_1$ and $\Delta W_2$, which are independently obtained, are selectively switched and transmitted because information generated and transmitted each time includes only a portion of the entire weight information. This is because weight information generated each time is formed according to a differential method using a characteristic of a channel between a current base station and the mobile station 17 and information that has been transmitted several times before.

The information feedback unit 280 transmits the partial weight vector $\Delta W$ provided from the switching unit 260 to the base stations 11 through 15 as feedback information via the antenna 210.

In one embodiment, the switching unit 260 switches and transmits one of the first and second partial weights to the first through the K-th base stations according to whether high-speed packet data is transmitted to the mobile station 17, for preparing a soft handover between the mobile station 17 and the first through K-th base stations 11 through 15. However, in another embodiment, the switching unit 260 switches and transmits one of the first and second partial weights to the first through the K-th base stations according to whether high-speed packet data is transmitted to only the mobile station 17, in a soft handover process between the mobile station 17 and the first through K-th base stations 11 through 15.

Figure 3:
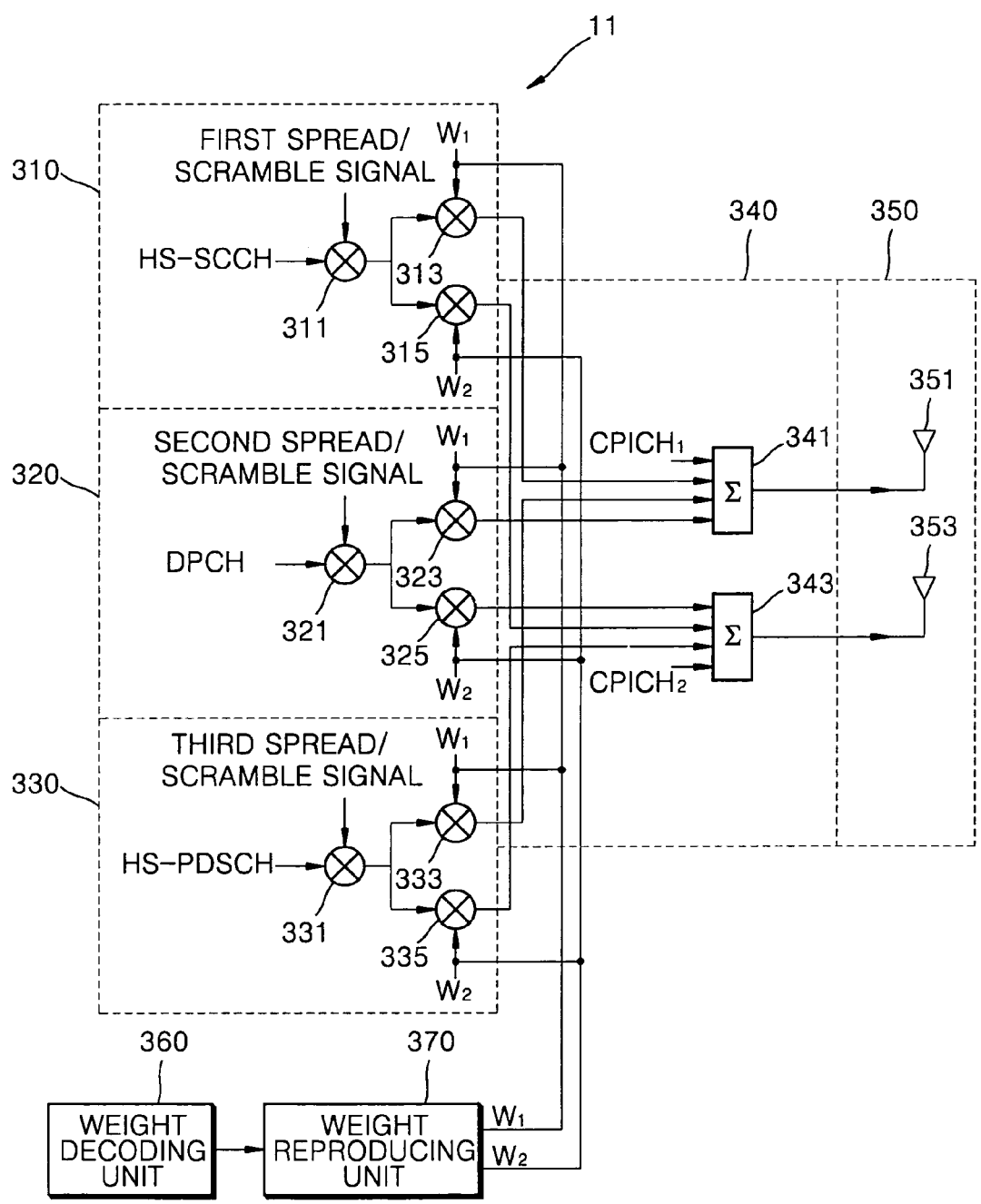
FIG. 3 is a block diagram of a base station according to an embodiment of the present invention.

FIG. 3 is a block diagram of the first base station 11 illustrated in FIG. 1, according to an embodiment of the present invention. As indicated above, the second through K-th base stations 13 through 15 illustrated in FIG. 1 have the same structure and operate in the same manner as the first base station 11, with the exception that they do not include an HS-SCCH transmitting unit 310 and an HS-PDSCH transmitting unit 330 and include only a DPCH transmitting unit 320. Accordingly, it is assumed that the HS-PDSCH transmission is performed from the first base station 11.

The difference between the first base station 11 and the second through K-th base stations 13 through 15 comes from a fact that because an HS-PDSCH and an HS-SCCH transmit high-speed packet data, a hard handover is performed on the HS-PDSCH and the HS-SCCH even while a dedicated physical channel (DPCH) is in a soft handover process. As illustrated in FIG. 3, although the DPCH in the soft handover has a different path than the HS-PDSCH and the HS-SCCH in the hard handover, the same weight is applied to the DPCH, the HS-PDSCH, and the HS-SCCH. Accordingly, it is preferable that the mobile station 17 correctly considers this fact.

The base station 11 illustrated in FIG. 3 is presented referring to the 3GPP specification 25.214, and operations of the base station 11 are described in detail in the 3GPP specification 25.214. Thus, only the improved parts of the base station 11 according to the present invention will be described in detail.

Referring to FIG. 3, the base station 11 includes the HS-SCCH transmitting unit 310, a DPCH transmitting unit 320, the HS-PDSCH transmitting unit 330, an addition unit 340, an antenna unit 350, a weight decoding unit 360, and a weight reproducing unit 370. The HS-SCCH transmitting unit 310 includes a first spread/scramble multiplier 311, a first weight multiplier 313, and a second weight multiplier 315. The DPCH transmitting unit 320 includes a second spread/scramble multiplier 321, a third weight multiplier 323, and a fourth weight multiplier 325. The HS-PDSCH transmitting unit 330 includes a third spread/scramble multiplier 331, a fifth weight multiplier 333, and a sixth weight multiplier 335. The addition unit 340 includes a first adder 341 and a second adder 343. The antenna unit 350 includes a first antenna 351 and a second antenna 353.

In the operation of the base station 11, the first spread/scramble multiplier 311 of the HS-SCCH transmitting unit 310 multiplies an HS-SCCH signal by a first spread/scramble signal and outputs the result of multiplication to the first and second weight multipliers 313 and 315. The first weight multiplier 313 multiplies the signal received from the first spread/scramble multiplier 311 by a first weight vector $W_1$ and outputs the result of multiplication, i.e., a first weighted spread/scramble signal for the HS-SCCH, to the first adder 341. The second weight multiplier 315 multiplies the signal received from the first spread/scramble multiplier 311 by a second weight vector $W_2$ and outputs the result of multiplication, i.e., a second weighted spread/scramble signal for the HS-SCCH, to the second adder 343.

In the DPCH transmitting unit 320, the second spread/scramble multiplier 321 multiplies a DPCH signal by a second spread/scramble signal and outputs the result of multiplication to the third and fourth weight multipliers 323 and 325. The third weight multiplier 323 multiplies the signal received from the second spread/scramble multiplier 321 by the first weight vector $W_1$ and outputs the result of multiplication, i.e., a first weighted spread/scramble signal for the DPCH, to the first adder 341. The fourth weight multiplier 325 multiplies the signal received from the second spread/scramble multiplier 321 by the second weight vector $W_2$ and outputs the result of multiplication, i.e., a second weighted spread/scramble signal for the DPCH, to the second adder 343.

In the HS-PDSCH transmitting unit 330, the third spread/scramble multiplier 331 multiplies a HS-PDSCH signal by a third spread/scramble signal and outputs the result of multiplication to the fifth and sixth weight multipliers 333 and 335. The fifth weight multiplier 333 multiplies the signal received from the third spread/scramble multiplier 331 by the first weight vector $W_1$ and outputs the result of multiplication, i.e., a first weighted spread/scramble signal for the HS-PDSCH, to the first adder 341. The sixth weight multiplier 335 multiplies the signal received from the third spread/scramble multiplier 331 by the second weight vector $W_2$ and outputs the result of multiplication, i.e., a second weighted spread/scramble signal for the HS-PDSCH, to the second adder 343.

The first through third spread/scramble signals are obtained by spreading/scrambling HS-SCCH data, DPCH data, and HS-PDSCH data, respectively.

In the addition unit 340, the first adder 341 adds up a common pilot signal $CPICH_1$ for the first antenna 351 and the weighted spread/scramble signals received from the first, third, and fifth multipliers 313, 323, and 333, respectively, and transmits the result of addition to the mobile station 17 through the first antenna 351. The second adder 343 adds up a common pilot signal $CPICH_2$ for the second antenna 353 and the weighted spread/scramble signals received from the second, fourth, and sixth multipliers 315, 325, and 335, respectively, and transmits the result of addition to the mobile station 17 through the second antenna 353.

The weight decoding unit 360 decodes partial weight information from feedback information transmitted from the mobile station 17 and transmits the decoded partial weight vector $\Delta W$ to the weight reproducing unit 370. Here, the feedback information is preferably an uplink dedicated physical control channel (DPCCH) transmitted from the mobile station 17.

The weight reproducing unit 370 combines several latest partial weights in the decoded partial weight vector $\Delta W$ to generate a weight vector W. When the base station 11 uses two antennas, as illustrated in FIG. 3, the weight vector W can be expressed by $W=[W_1 \ W_2]^T$. As described in the 3GPP specification 25.214, usually, two latest partial weights are combined in mode 1, and four latest partial weights are combined in mode 2. When partial weights are combined, they are disposed according to the binary scale. For example, in mode 1, $W(t)=\Delta W(t)+\Delta W(t-1)$.

Summarily, when a packet channel such as a PDSCH, HS-PDSCH, or HS-SCCH is associated with a dedicated channel, e.g., a DPCH, for which closed-loop transmit diversity is applied, the antenna weights applied to the PDSCH, HS-PDSCH, and HS-SCCH, respectively, are the same as the antenna weights applied to the associated DPCH. When a packet channel such as a PDSCH, HS-PDSCH, or HS-SCCH is associated with a dedicated channel, e.g., a DPCH, during soft handover, the mobile station may emphasize the radio link carrying the PDSCH, HS-PDSCH, or HS-SCCH, respectively, when calculating the antenna weights.

The present invention can be embodied as a computer readable code in a computer readable medium. Here, the computer readable medium may be any recording apparatus capable of storing data that can be read by a computer system, e.g., read-only memory (ROM), random access memory (RAM), compact disc (CD)-ROM, a magnetic tape, a floppy disk, an optical data storage device, etc. Also, the computer readable medium may be a carrier wave that transmits data via the Internet, for example.

According to the present invention, in order to account for a soft handover between a mobile station and a first through K-th base stations, the mobile station selectively transmits a first partial weight vector obtained by equally considering channel characteristics of all base stations, which are located in a soft handover region, or a second partial weight vector obtained by emphasizing a channel characteristic of a base station transmitting HS-PDSCH data more than channel characteristics of the other base stations to a base station according to whether the base station transmits high-speed packet data to the mobile station, so that the second partial weight vector, which is different from the first partial weight vector, can be used as a weight vector for a transmission antenna when high-speed packet data is transmitted to the mobile station. As a result, while high-speed packet data is transmitted to the mobile station in a soft handover region, the mobile station may emphasize the radio link carrying the packet channel, when calculating the antenna weights, thereby achieving a more reliable transmission by obtaining an optimal gain of transmit diversity.

Although a number of preferred embodiments of the present invention have been shown and described herein, it will be appreciated by those skilled in the art that changes may be made in these elements without departing from the principles and spirit of the invention, the scope of which is defined in the appended claims and their equivalents.

What is claimed is:

1. An apparatus for controlling transmission antenna arrays for a high speed physical downlink shared channel, which coexists with a dedicated physical channel, from a first base station to a mobile station, for taking into consideration a soft handover between the mobile station and the first through K-th base stations in a mobile communication system, the mobile station comprising:
   a first partial weight generating unit for obtaining a first partial weight by equally considering channel characteristics of the first through the K-th base stations;
   a second partial weight generating unit for obtaining a second partial weight by emphasizing a channel characteristic of the first base station more than channel characteristics of a second through the K-th base stations; and
   a switching unit for transmitting one of the first and second partial weights to the first through the K-th base stations as feedback information according to whether the high-speed packet data is transmitted to the mobile station.

2. The apparatus of claim 1, wherein the switching unit transmits one of the first and second partial weights to the first through the K-th base stations as feedback information according to whether the high-speed packet data is transmitted to the mobile station, when the mobile station is in a soft handover process with the first through the K-th base stations.

3. The apparatus of claim 1, wherein the first partial weight generating unit obtains a first intermediate value by performing addition after an inner product on the channel characteristics of the first through the K-th base stations, respectively, and obtains the first partial weight using the first intermediate value and previous first weight information.

4. The apparatus of claim 1, wherein the second partial weight generating unit obtains a second intermediate value by multiplying channel characteristics of the first base station by a first coefficient, multiplying channel characteristics of the second through the K-th base stations, respectively, by a second coefficient and then performing addition after an inner product on the multiplied channel characteristics of the first through K-th base stations, respectively, and obtains the second partial weight using the second intermediate value and previous second weight information.

5. The apparatus of claim 4, wherein the first coefficient is greater than the second coefficient.

6. The apparatus of claim 1, wherein the switching unit selects the second partial weight when the high-speed packet data is transmitted to the mobile station through an antenna of the mobile station and selects the first partial weight when the high-speed packet data is not transmitted to the mobile station.

7. The apparatus of claim 6, wherein the switching unit selects the second partial weight from a time when the mobile station recognizes that the high-speed packet data is transmitted to the mobile station to a time when the high-speed packet data transmission is completed.

8. The apparatus of claim 1 further comprising a packet reception indicator detection unit for determining whether the high-speed packet data is transmitted to the mobile station based on a packet reception indicator detected from a signal transmitted from an antenna, and controlling the switching unit according to a result of determination.

9. The apparatus of claim 1, wherein high speed shared control physical channel transmission, a dedicated physical channel transmission, and a high speed physical downlink shared channel transmission are served in the first base station and the dedicated physical channel transmission is served in the second through the K-th base stations, respectively.

10. The apparatus of claim 1, wherein the first base station comprises:
   an antenna unit including at least two antennas;
   a high speed shared control physical channel transmitting unit for generating first and second weighted spread/scramble signals using a high speed shared control physical channel signal, a first spread/scramble signal, a first weight, and a second weight;
   a dedicated physical channel transmitting unit for generating third and fourth weighted spread/scramble signals using a dedicated physical channel signal, a second spread/scramble signal, and the first and second weights;
   a high speed physical downlink shared channel transmitting unit for generating fifth and sixth weighted spread/scramble signals using a high speed physical downlink shared channel signal, a third spread/scramble signal, and the first and second weights;
   an addition unit for adding a common pilot signal for a first antenna, the first weighted spread/scramble signal, the third weighted spread/scramble signal, and the fifth weighted spread/scramble signal and transmitting a result of the addition to the first antenna, and adding a common pilot signal for a second antenna, the second weighted spread/scramble signal, the fourth weighted spread/scramble signal, and the sixth weighted spread/scramble signal, and transmitting a result of the addition to the second antenna;
   a weight decoding unit for decoding partial weight information from feedback information of an uplink dedicated physical control channel transmitted from the mobile station; and
   a weight reproducing unit for combining a plurality of latest partial weights in the decoded partial weight information to generates the first and second weights.

11. The apparatus of claim 10, wherein each of the second through the K-th base stations comprises:
   an antenna unit which including at least two antennas;
   a dedicated physical channel transmitting unit for generating the third and fourth weighted spread/scramble signals using a dedicated physical channel signal, a second spread/scramble signal, and the first and second weights;
   an addition unit for adding a common pilot signal for a first antenna and the third weighted spread/scramble signal, and transmitting a result of the addition to the first antenna, and adding a common pilot signal for a second antenna and the fourth weighted spread/scramble signal, and transmitting a result of the addition to the second antenna;
   a weight decoding unit for decoding partial weight information from feedback information of an uplink dedicated physical control channel transmitted from the mobile station; and
   a weight reproducing unit for combining a plurality of latest partial weights in the decoded partial weight information to generates the first and second weights.

12. A method of controlling transmission antenna arrays for a high speed physical downlink shared channel, which coexists with a dedicated physical channel, from a first base station to a mobile station, for taking into consideration a soft handover between the mobile station and the first through K-th base stations in a mobile communication system, the method comprising:
   obtaining a first partial weight by equally considering channel characteristics of the first through the K-th base stations;
   obtaining a second partial weight by emphasizing a channel characteristic of the first base station more than channel characteristics of a second through the K-th base stations; and
   transmitting one of the first and second partial weights to the first through the K-th base stations as feedback information according to whether the high-speed packet data is transmitted to the mobile station.

13. The method of claim 12, wherein the transmitting one of the first and second partial weights to the first through the K-th base stations as feedback information according to whether the high-speed packet data is transmitted to the mobile station, when the mobile station is in a soft handover process with the first through the K-th base stations.

14. The method of claim 12, wherein a first intermediate value is obtained by performing addition after an inner product on the channel characteristics of the first through the K-th base stations, respectively, and the first partial weight is obtained using the first intermediate value and previous first weight information.

15. The method of claim 12, wherein a second intermediate value is obtained by multiplying channel characteristics of the first base station by a first coefficient, multiplying channel characteristics of the second through the K-th base stations, respectively, by a second coefficient and then performing addition after an inner product on the multiplied channel characteristics of the first through the K-th base stations, respectively, and the second partial weight is obtained using the second intermediate value and previous second weight information.

16. The method of claim 15, wherein the first coefficient is greater than the second coefficient.

17. The method of claim 12, wherein the second partial weight is selected when the high-speed packet data is transmitted to the mobile station through an antenna of the mobile station and the first partial weight is selected when the high-speed packet data is not transmitted to the mobile station.

18. The method of claim 17, wherein the second partial weight is selected from a time when the mobile station recognizes that the high-speed packet data is transmitted to the mobile station to a time when the high-speed packet data transmission is completed.

19. The method of claim 12, further comprising:
   generating first and second weighted spread/scramble signals using a high speed shared control physical channel signal, a first spread/scramble signal, a first weight, and a second weight, generating third and fourth weighted spread/scramble signals using a dedicated physical channel signal, a second spread/scramble signal, and the first and second weights, and generating fifth and sixth weighted spread/scramble signals using a high speed physical downlink shared channel signal, a third spread/scramble signal, and the first and second weights in the first base station; and adding a common pilot signal for a first antenna, the first weighted spread/scramble signal, the third weighted spread/scramble signal, and the fifth weighted spread/scramble signal, and transmitting a result of the addition to the first antenna, and adding a common pilot signal for a second antenna, the second weighted spread/scramble signal, the fourth weighted spread/scramble signal, and the fifth weighted spread/scramble signal, and transmitting a result of addition to the second antenna, in the first base station;

wherein the first and second weights are obtained by combining a plurality of latest partial weights in partial weight information decoded from feedback information transmitted from the mobile station.

20. The method of claim 19, further comprising:

generating the third and fourth weighted spread/scramble signals using a dedicated physical channel signal, a second spread/scramble signal, and the first and second weights, in each of the second through K-th base stations; and adding a common pilot signal for a first antenna and the third weighted spread/scramble signal and transmitting a result of the addition to the first antenna, and adding a common pilot signal for a second antenna and the fourth weighted spread/scramble signal and transmitting a result of the addition to the second antenna, in each of the second through K-th base stations;

wherein the first and second weights are obtained by combining a plurality of latest partial weights in partial weight information decoded from feedback information transmitted from the mobile station.

21. A computer program device readable by a machine, tangibly embodying a program of instructions executable by the machine to perform method steps for a method of controlling transmission antenna arrays for a high speed physical downlink shared channel, which coexists with a dedicated physical channel, from a first base station to a mobile station, for taking into consideration a soft handover between the mobile station and the first through K-th base stations in a mobile communication system, the method comprising:

obtaining a first partial weight by equally considering channel characteristics of the first through the K-th base stations;

obtaining a second partial weight by emphasizing a channel characteristic of the first base station more than channel characteristics of a second through the K-th base stations; and transmitting one of the first and second partial weights to the first through the K-th base stations as feedback information according to whether the high-speed packet data is transmitted to the mobile station.

* * * * *